(12) United States Patent
Ikeda (10) Patent No.: US 9,767,376 B2
(45) Date of Patent: Sep. 19, 2017

(54) DRAWING APPARATUS, DRAWING METHOD, AND RECORDING MEDIUM FOR USE IN DISPLAYING A CHARACTER DEFINED IN A PREDETERMINED OUTLINE FONT FORMAT

(71) Applicant: CANON KABUSHIKI KAISHA, Tokyo (JP)

(72) Inventor: Atsushi Ikeda, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 218 days.

(21) Appl. No.: 14/506,389

(22) Filed: Oct. 3, 2014

(65) Prior Publication Data

US 2015/0097841 A1 Apr. 9, 2015

(30) Foreign Application Priority Data

Oct. 8, 2013 (JP) ................. 2013-211218

(51) Int. Cl.
G06T 11/00 (2006.01)
G06K 9/18 (2006.01)
G06T 11/20 (2006.01)
G06K 9/00 (2006.01)

(52) U.S. Cl.
CPC ........... *G06K 9/18* (2013.01); *G06K 9/00402* (2013.01); *G06T 11/203* (2013.01)

(58) Field of Classification Search
None
See application file for complete search history.

(56) References Cited

U.S. PATENT DOCUMENTS

2004/0227771 A1* 11/2004 Arnold .................. G06T 11/203
345/611
2009/0009529 A1* 1/2009 Matskewich ........... G06T 5/001
345/619

FOREIGN PATENT DOCUMENTS

JP 2007-121874 A 5/2007

* cited by examiner

*Primary Examiner* — Barry Drennan
*Assistant Examiner* — Diana Hickey
(74) *Attorney, Agent, or Firm* — Canon U.S.A., Inc. IP Division (57) ABSTRACT

A drawing apparatus that displays a character rendered in an outline method includes a number-of-commands identification unit configured to identify a number of drawing commands required for the character based on outline data that corresponds to a shape of the character, a level determination unit configured to determine a level of an antialiasing process to be performed on the character based on the number of the drawing commands found by the number-of-commands identification unit, and a drawing unit configured to execute the antialiasing process of the level determined for the character by the level determination unit, when the character is drawn based on the outline data of the character.

16 Claims, 6 Drawing Sheets

"G" WHOSE NUMBER OF DRAWING COMMANDS IS 47

FONT WITH MANY CURVES,
LOW ANTIALIASING LEVEL

FONT WITH MANY CURVES,
HIGH ANTIALIASING LEVEL

"G" WHOSE NUMBER OF DRAWING COMMANDS IS 47

FONT WITH MANY CURVES,
LOW ANTIALIASING LEVEL

FONT WITH MANY CURVES,
HIGH ANTIALIASING LEVEL

FIG. 6B

"G" WHOSE NUMBER OF DRAWING COMMANDS IS 57

FONT WITH MANY
STRAIGHT LINES,
LOW ANTIALIASING LEVEL

FORT WITH MANY
STRAIGHT LINES,
HIGH ANTIALIASING LEVEL

DRAWING APPARATUS, DRAWING METHOD, AND RECORDING MEDIUM FOR USE IN DISPLAYING A CHARACTER DEFINED IN A PREDETERMINED OUTLINE FONT FORMAT

BACKGROUND OF THE INVENTION

Field of the Invention

The present invention relates to a drawing apparatus, a drawing method, and a recording medium.

Description of the Related Art

Apparatuses, which receive as an input a command to draw two-dimensional graphics data including an outline font, rasterize the data, and output the rasterized data, have been commonly known. Such apparatuses can clearly draw characters by performing high-level antialiasing on the characters. However, when a high-level antialiasing process is executed, a calculation load increases.

The calculation load can be reduced by lowering a level of the antialiasing process. However, in the case of a low-level antialiasing process, a phenomenon in which two lines of a character overlap or a rectangular space surrounded by lines of a character is solidly filled, or the like, may occur depending on characters.

In order to solve the above problem, Japanese Patent Application Laid-Open No. 2007-121874 discusses a technique in which an antialiasing process is performed on an outline font by using colors, the number of which monotonously decreases corresponding to a drawing size of the font.

However, according to the technology described in Japanese Patent Application Laid-Open No. 2007-121874, in a case where a drawing size is small, the antialiasing process is performed at a high level even on simple-form characters. This causes a problem of increase in the calculation load, even though appearance is not very much improved. On the other hand, in a case where a drawing size is large, the antialiasing process is performed at a low level even on complicate characters. Therefore, there is a problem of deterioration in appearance.

SUMMARY OF THE INVENTION

The present invention is directed to a drawing apparatus that reduces the calculation load while drawing characters clearly, by performing an antialiasing process at a level appropriate for an object to draw.

A drawing apparatus that displays a character rendered in an outline method includes a number-of-commands identification unit configured to identify a number of drawing commands required for the character based on outline data that corresponds to a shape of the character, a level determination unit configured to determine a level of an antialiasing process to be performed on the character based on the number of the drawing commands found by the number-of-commands identification unit, and a drawing unit configured to execute the antialiasing process of the level determined for the character by the level determination unit, when the character is drawn based on the outline data of the character.

Further features of the present invention will become apparent from the following description of exemplary embodiments with reference to the attached drawings.

DESCRIPTION OF THE EMBODIMENTS

Hereinafter, exemplary embodiments of the present invention will be described with reference to the accompanying drawings.

Figure 1:
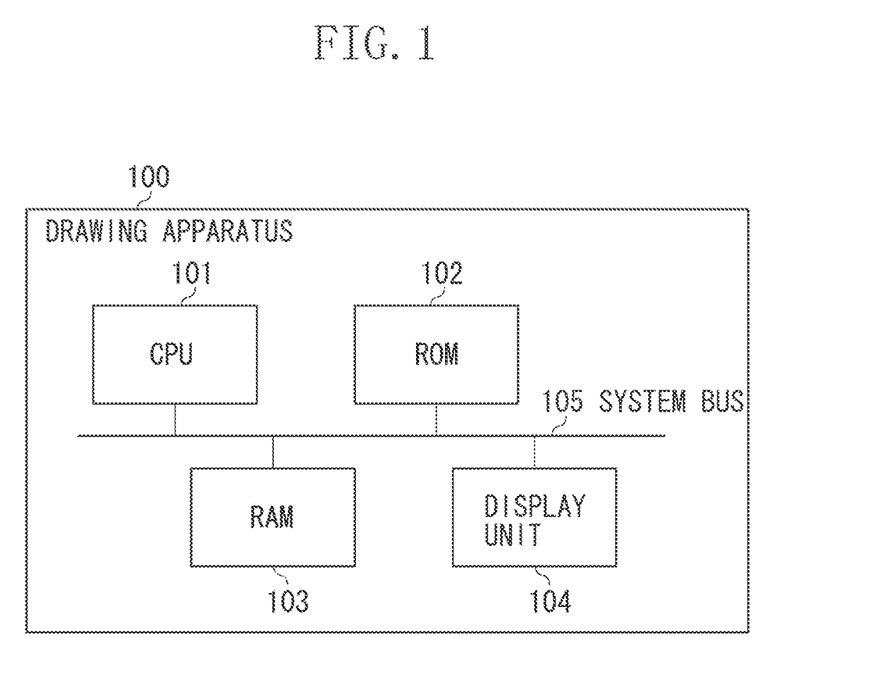
FIG. 1 is a block diagram illustrating a drawing apparatus.

FIG. 1 illustrates a hardware configuration of a drawing apparatus 100 according to a first exemplary embodiment. The drawing apparatus 100 displays a plurality of outline fonts that are rendered in an outline method. The drawing apparatus 100 has a central processing unit (CPU) 101 and a read-only memory (ROM) 102. The drawing apparatus 100 also has a random-access memory (RAM) 103, a display unit 104, and a system bus 105.

The CPU 101 controls the entire drawing apparatus 100. The ROM 102 stores programs and parameters that do not need to be changed. The RAM 103 temporarily stores programs and data that are supplied from external apparatuses and the like. The display unit 104 is an interface for displaying data stored in the RAM 103 or the like, and data supplied from external apparatuses or the like.

Functions and processes of the drawing apparatus 100 described below are realized by the CPU 101 reading a program from the ROM 102 or the like and executing the program.

The system bus 105 communicably connects the aforementioned units 101 to 104. The drawing apparatus 100 may further have input devices, such as a keyboard and a pointing device including a mouse, to input data to the drawing apparatus 100 according to operations performed by a user, or may further have interfaces for input devices.

The drawing apparatus 100 may also have a hard disk, and/or a memory card. The drawing apparatus 100 may also have an interface for a hard disk or the like which is fixedly mounted to the drawing apparatus 100, so that the apparatus 100 can use the hard disk or the like.

The drawing apparatus 100 may further have external storage devices or the like that are attachable to and detachable from the drawing apparatus 100, or may further have interfaces for external storage devices or the like. Attachable and detachable external storage devices include a flexible disk (FD), an optical disk such as a compact disk (CD), a magnetic or optical card, an integrated circuit (IC) card, and a memory card. The drawing apparatus 100 may further have a network interface or the like for connecting to a network line, such as the Internet.

Figure 2:
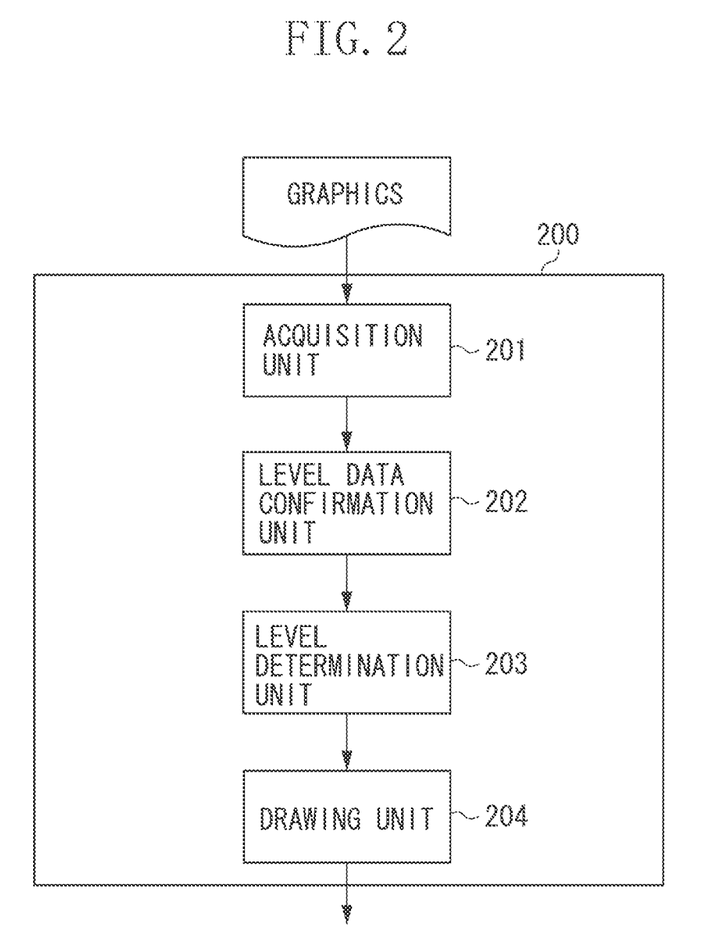
FIG. 2 is a block diagram illustrating a processing unit.

FIG. 2 illustrates a processing unit 200 of the drawing apparatus 100. The processing unit 200 has an acquisition unit 201, a level data confirmation unit 202, a level determination unit 203, and a drawing unit 204. The acquisition unit 201 acquires outline data (D) that indicates an outline font (F), from two-dimensional graphics data that is input from an external apparatus.

The level data confirmation unit 202 confirms whether the outline data (D) includes level data (L) that indicates a level of an antialiasing process. The level herein means accuracy of the antialiasing process. It is assumed that the drawing apparatus 100 according to the present exemplary embodiment can perform the antialiasing process at two levels, "high" and "low". The level "high" indicates that accuracy of the antialiasing process is high, and the level "low" indicates that accuracy of the antialiasing process is low.

If the outline data (D) includes the level data (L), the level determination unit 203 determines the level indicated by the level data (L) as the level of the antialiasing process to be performed on the outline font (F). If the outline data (D) does not include the level data (L), the level determination unit 203 refers to the outline data (D), and determines the level of the antialiasing process to be performed, based on a shape of the outline font (F).

The drawing unit 204 draws the outline font (F) by performing the antialiasing process at the level determined by the level determination unit 203.

Figure 3:
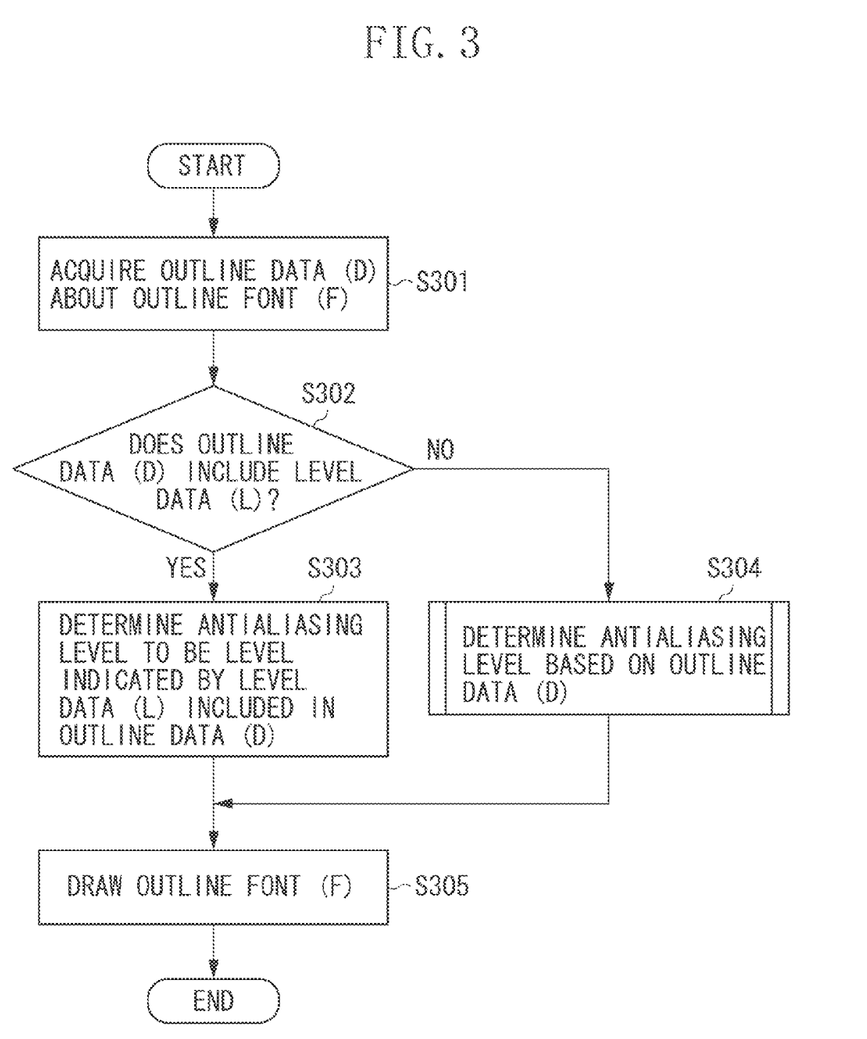
FIG. 3 is a flowchart illustrating a drawing process.

FIG. 3 is a flowchart illustrating the drawing process executed by the processing unit 200. In step S301, the acquisition unit 201 acquires the outline data (D) for the outline font (F) from the two-dimensional graphics data. Next, in step S302, the level data confirmation unit 202 confirms whether the outline data (D) acquired in step S301 includes the level data (L) for the antialiasing process (confirmation process). If the level data confirmation unit 202 confirms that the outline data (D) includes the level data (L) (YES in step S302), the process proceeds to step S303. On the other hand, if the level data confirmation unit 202 finds that the outline data (D) does not confirm that the outline data (D) includes the level data (L) (NO in step S302), the process proceeds to step S304.

In step S303, the level determination unit 203 acquires the level data (L) from the outline data (D). Then, the level determination unit 203 determines that the level of the antialiasing process to be performed when the outline font (F) is drawn is the level indicated by the level data (L) (level determination process). In addition, the level data (L) is assumed to indicate either of the levels "high" or "low".

In step S304, the level determination unit 203 refers to the outline data (D), and determines the level of the antialiasing process to be performed on the outline font (F), on the basis of a shape of the outline font (F) (level determination process). The process performed in step S304 will be described below with reference to FIG. 4.

Next, in step S305, the drawing unit 204 performs the antialiasing process at the level determined in step S303 or step S304, and draws the outline font (F) on the basis of the outline data (D) (drawing process). Then the drawing process ends.

Figure 4:
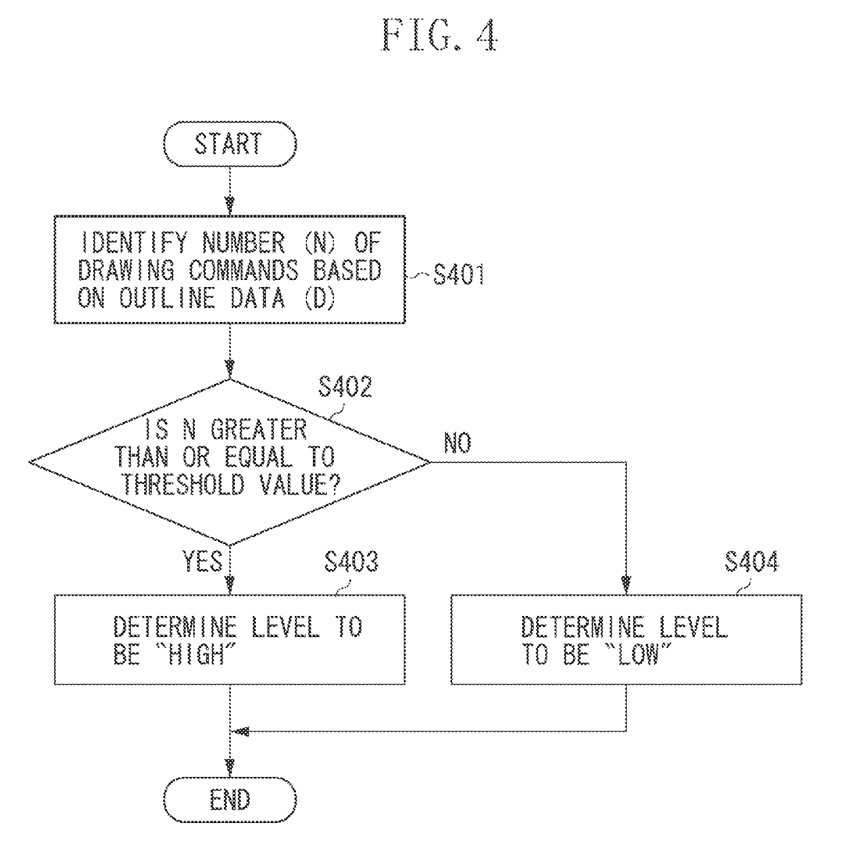
FIG. 4 is a flowchart illustrating a level determination process.

FIG. 4 is a flowchart illustrating the level determination process (step S304) in detail. In step S401, the level determination unit 203 identifies the number (N) of drawing commands from the outline data (D) (number-of-commands identification process). Next, in step S402, the level determination unit 203 determines whether the number (N) of drawing commands found in step S401 is greater than or equal to a threshold value of the number N. It is assumed herein that the threshold value of the number N is pre-stored in, for example, the ROM 102.

If the number (N) of drawing commands is greater than or equal to the threshold value of the number N (YES in step S402), the processing proceeds to step S403. If the number (N) of drawing commands is less than the threshold value of the number N (NO in step S402), the processing proceeds to step S404. In step S403, the level determination unit 203 determines that the level of the antialiasing process is to be "high". In step S404, the level determination unit 203 determines that the level of the antialiasing process is to be "low".

In general, a character simple in appearance with small numbers of strokes, such as an alphabetical letter "L", tends to require a smaller number of drawing commands. On the other hand, there exist characters complicate in appearance, such as Chinese characters, which may have particularly many strokes. Such a character tends to require a large number of drawing commands. Therefore, the number of drawing commands can serve as an index of complexity of characters. Furthermore, it is preferable that as a character is more complicate, the more accurate antialiasing process is to be applied to the character.

Therefore, in step S402, the level determination unit 203 determines the level of antialiasing to be performed, by comparing the number N of drawing commands with the threshold value of the number N. More specifically, the level determination unit 203 in the present exemplary embodiment determines the level of the antialiasing process on the basis of complexity of a character in terms of its shape.

As described above, the drawing apparatus 100 according to the first exemplary embodiment performs the antialiasing process at a level appropriate for a shape (complexity) of a character that is an object to draw. Therefore, the drawing apparatus 100 can draw characters clearly while reducing the calculation load.

In addition, in the present exemplary embodiment, there are two levels of the antialiasing process. However, if the drawing apparatus 100 can perform the antialiasing process at three or more different levels, the level determination unit 203 determines a suitable level from among the three or more levels. More specifically, the level determination unit 203 determines the level of antialiasing to be performed, through a threshold process that uses a plurality of threshold values of the number N.

Next, a drawing apparatus 100 according to a second exemplary embodiment will be described. The drawing apparatus 100 according to the second exemplary embodiment is different from the drawing apparatus 100 according to the first exemplary embodiment in the process performed in the level determination process (step S304). The drawing apparatus 100 according to the second exemplary embodiment will be herein described with regard to features different from those of the first exemplary embodiment.

Figure 5:
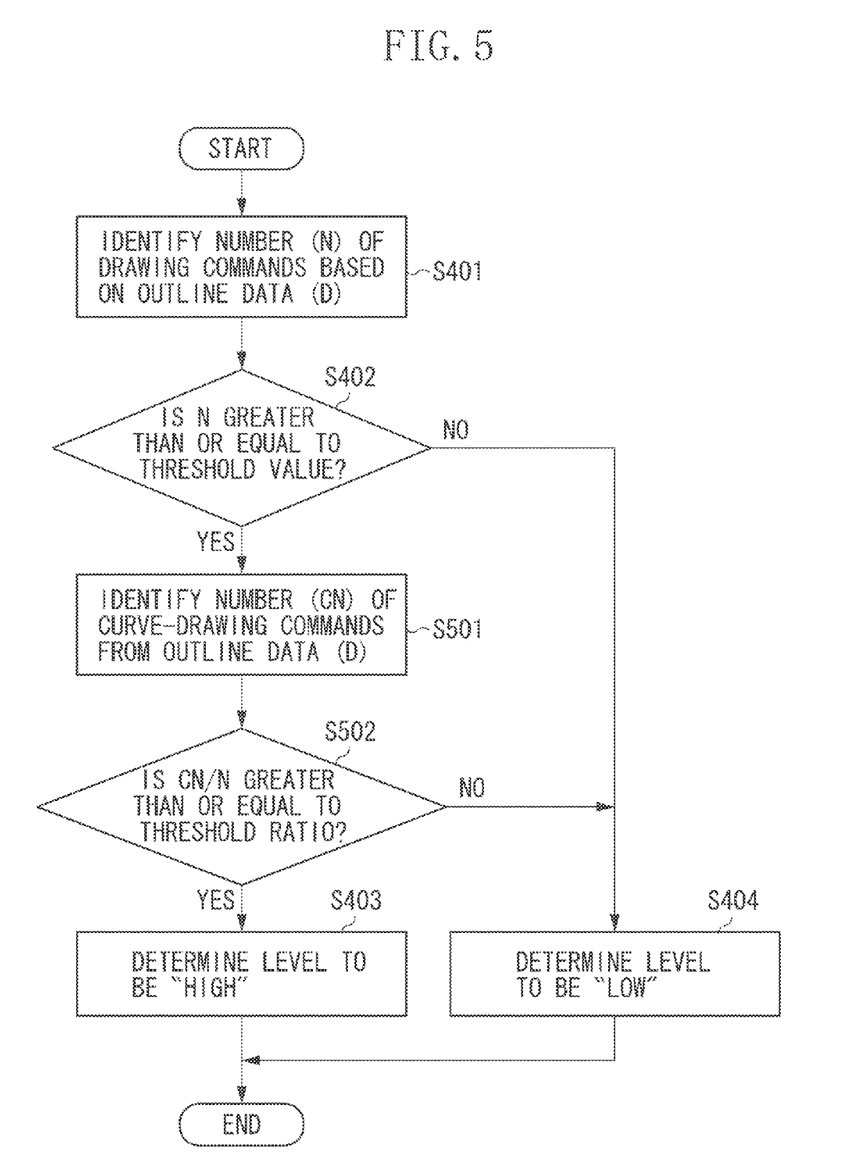
FIG. 5 is a flowchart illustrating another level determination process.

FIG. 5 is a flowchart illustrating in detail the process performed in the level determination process (step S304) by the drawing apparatus 100 according to the second exemplary embodiment. In addition, the same processes as those performed in the level determination process in the first exemplary embodiment are denoted by the same numbers.

If in step S402, the level determination unit 203 determines that the number (N) of drawing commands is greater than or equal to the threshold value of the number N (YES in step S402), the processing proceeds to step S501. In step S501, the level determination unit 203 identifies the number (CN) of curve-drawing commands on the basis of the outline data (D) (number-of-curve-drawing-commands identification process).

Next, in step S502, the level determination unit 203 compares the ratio CN/N with a threshold ratio. It is assumed herein that the threshold ratio is set beforehand in the ROM 102 or the like. If the ratio CN/N is greater than or equal to the threshold ratio (YES in step S502), the processing proceeds to step S403. On the other hand, if the ratio CN/N is less than the threshold ratio (NO in step S502), the processing proceeds to step S404.

In addition, configurations and processes of the drawing apparatus 100 according to the second exemplary embodiment other than those described above are substantially the same as those of the drawing apparatus 100 according to the first exemplary embodiment.

Thus, the level determination unit 203 in the second exemplary embodiment determines the level of antialiasing to be performed, on the basis of not only the number of drawing commands but also the ratio of the number of curve-drawing commands to the number of drawing commands. More specifically, the level determination unit 203 determines the level of antialiasing on the basis of the proportion of curves in each character as a whole in terms of its shape.

Figure 6A:
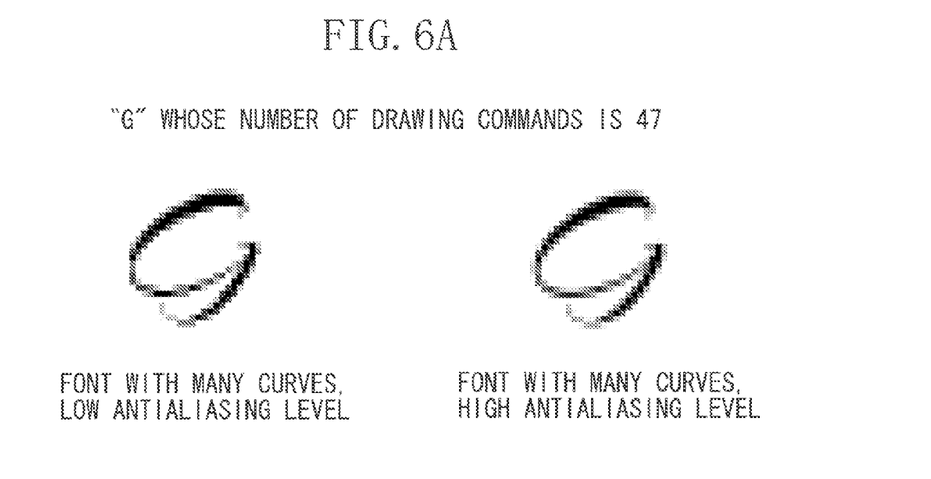
FIGS. 6A and 6B illustrate a process of comparing CN/N, where CN is the number of curve-drawing commands and N is the number of drawing commands, with a threshold ratio.
Figure 6B:
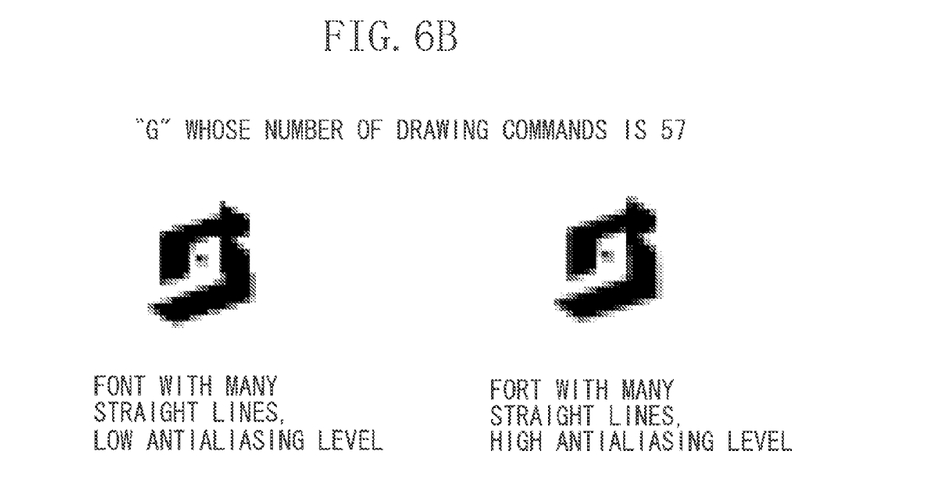

FIGS. 6A and 6B are diagrams illustrating a process of comparing the ratio CN/N with the threshold ratio (step S502, step S403, and step S404). FIG. 6A illustrates examples of results obtained when a character "G" rendered in a font designed with many curves is drawn with the level "low" or the level "high" of the antialiasing process performed. Although the character "G" has a small number of strokes and does not look complicated, its total number of drawing commands is as great as 47 when a font called "Arizona-Regular" is used.

Thus, for a character which has a high ratio of curves in the elements that constitute the character, the total number of drawing commands is great. This is because the need to express curves unique to the font increases the total number of drawing commands. In other words, a character having a high ratio of curves tends to have large total number of drawing commands, even in a case where such characters do not look complicated.

Furthermore, it can be understood that the drawing result of the character in the font designed with many curves at the "high" antialiasing level is clearer than that in the font designed with many curves at the "low" antialiasing level. In the example in FIG. 6A, dark color pixels exist around the start point (an upper right point) of "G" as the drawing result at the "low" antialiasing level. In contrast, there is a smooth gradation around the start point of "G" as the drawing result at the "high" antialiasing level. Further, in the example in FIG. 6A, the color gradation along the center line of "G" as the drawing result at the "low" antialiasing level is more discrete than the "high" case. Further, in the example in FIG. 6A, the color of pixel around the end point (a bottom point) of "G" as the drawing result at the "low" antialiasing level is too light. In contrast, the color of pixel around the end point of "G" as the drawing result at the "high" antialiasing level is darker than the "low" case and has a high level of visibility. More specifically, it can be understood that it is appropriate that fonts designed with many curves be subjected to the antialiasing process at a relatively high level.

On the other hand, FIG. 6B illustrates examples of results obtained when the same character "G" used in FIG. 6A is drawn by using a font designed with many straight lines (straight portions) and performing the antialiasing process at the level "low" or the level "high". The total number of drawing commands in drawing the character "G" in, for example, a font called "Simpletype", is 57, which is greater than the total number of drawing commands in the case of the font designed with many curves.

However, the drawing results respectively corresponding to the level "low" and the level "high" in antialiasing which are obtained by using the same font designed with many straight lines do not exhibit much difference in beauty in appearance. In other words, considering the calculation load required when the level of the antialiasing process is set to the level "high", it can be understood that, for fonts designed with many straight lines, it is appropriate to set the level of the antialiasing process to the level "low".

A large number of drawing commands are required for both of fonts designed with many curves and those with many straight lines as mentioned above. If a character in a font designed with many straight lines can be clearly drawn even with the level "low" antialiasing process, this is because the font has many straight lines.

Many of the drawing commands included in the outline data (D) for characters having many curves are curve drawing commands. Therefore, in the drawing of characters rendered in fonts designed with many curves, the ratio of the number of curve-drawing commands to the total number of drawing commands is large. On the other hand, in the drawing of characters rendered in fonts designed with many straight lines, the ratio of the number of curve-drawing commands to the total number of drawing commands is small.

In view of the above-mentioned points, in the process according to the second exemplary embodiment, the level of the antialiasing process to be performed is determined according to not only the process of comparing the number N of drawing commands with the threshold value of the number N (step S402) but also the process of comparing the ratio CN/N with the threshold ratio (step S502).

Therefore, as for characters with a low ratio of the number of curve-drawing commands, the drawing apparatus 100 according to the second exemplary embodiment can not only draw the characters clearly but also reduce the calculation load and then increase the processing speed.

The configurations and processes of the drawing apparatus 100 according to the second exemplary embodiment other than those described above are substantially the same as those of the drawing apparatus 100 according to the first exemplary embodiment.

In addition, the level determination unit 203 may identify the number of straight-drawing commands (LN) instead of the number of curve-drawing commands. In this case, the level determination unit 203 compares the ratio LN/N with a threshold ratio. Then, the level determination unit 203 determines that the degree of complexity is "low" if the ratio LN/N is greater than or equal to the threshold ratio, and determines that the degree of complexity is "high" if the ratio LN/N is less than the threshold ratio.

Further, although the drawing apparatus 100 according to each of the exemplary embodiments refers to the number of drawing commands as a concrete process for determining the level of the antialiasing process to be performed based on a shape of a character, the present invention is not limited to this configuration.

In other example of the present invention, the level determination unit 203 may identify the number and types of control points in the outline font (F) from the outline data (D) (number-of-control-points identification process), and may determine the level of antialiasing to be performed, on the basis of the number and types of control points. More specifically, the level determination unit 203 determines that the level of antialiasing is to be "high" if the number of control points is greater than or equal to a threshold value of the number of control points, and determines that the level of antialiasing is to be "low" if the number of control points is less than the threshold value of the number of control points.

The greater the number of strokes of a character is, the greater the number of control points of the character is. Furthermore, the greater the proportion of curves in a character is and the more complicated the curves are, the greater the number of control points of the character is. Therefore, the drawing apparatus 100 can perform the antialiasing process which is appropriate for a shape of a character by determining higher levels of antialiasing for the character that has a greater number of control points.

Furthermore, the present invention can also be realized by executing the following process. More specifically, software (program) that realizes the functions of the exemplary embodiments described above is supplied to a system or an apparatus via a network or one of various kinds of storage media. Then, the program is read and executed by a computer (or a CPU, a micro-processing unit (MPU), etc.) of the system or the apparatus. Through this process, the present invention can be realized.

According to the above-mentioned exemplary embodiments, it is possible to draw characters clearly while reducing the calculation load by performing the antialiasing process at levels appropriate for objects to draw.

While the preferred exemplary embodiments of the present invention have been described in detail above, the present invention is not limited by any specific exemplary embodiment, but can be modified and changed in various manners within the scope of the present invention described in the appended claims.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-211218 filed Oct. 8, 2013, which is hereby incorporated by reference herein in its entirety.

What is claimed is:

1. A drawing apparatus for use in displaying a character defined in a predetermined outline font format, the drawing apparatus comprising:
   one or more processors; and
   one or more memory devices including instructions that, when executed by the one or more processors, cause the one or more processors to perform operations comprising:
      before drawing the character, identifying a number of drawing commands required for the character based on outline data corresponding to a shape of the character in the predetermined outline font format;
      determining a level of an antialiasing process to be performed on the character based on the identified number of the drawing commands; and
      after the determining the level of the antialiasing process for the character, drawing the character by performing the antialiasing process at the level determined for the character.

2. The drawing apparatus according to claim 1, the operations further comprising identifying a number of curve-drawing commands required for the character based on the outline data,
   wherein the determining the level of the antialiasing process comprises determining the level based on a ratio of the number of the curve-drawing commands to the number of the drawing commands.

3. The drawing apparatus according to claim 1, the operations further comprising identifying a number of control points of the character based on the outline data,
   wherein the determining the level of the antialiasing process comprises determining the level based on the number of the control points.

4. The drawing apparatus according to claim 1, the operations further comprising confirming whether the outline data includes level data that indicates the level of the antialiasing process,
   wherein the determining the level of the antialiasing process comprises determining the level based on the shape of the character if the outline data does not include the level data.

5. The drawing apparatus according to claim 4, wherein the determining the level of the antialiasing process comprises, if the outline data includes the level data, determining that the level of the antialiasing process to be performed when the character is drawn is a level indicated by the level data.

6. A drawing method executed by a drawing apparatus for use in displaying a character defined in a predetermined outline font format, the drawing method comprising:
   before drawing the character, identifying a number of drawing commands required for the character based on outline data corresponding to a shape of the character in the predetermined outline font format;
   determining a level of an antialiasing process to be performed on the character based on the identified number of drawing commands; and
   after the determining the level of the antialiasing process for the character, drawing the character by performing the antialiasing process at the level determined for the character.

7. A drawing apparatus for use in displaying a character defined in a predetermined outline font format, the drawing apparatus comprising:
   one or more processors; and
   one or more memory devices including instructions that, when executed by the one or more processors, cause the one or more processors to perform operations comprising:
      before drawing the character, identifying a number of control points of the character based on outline data corresponding to a shape of the character in the predetermined outline font format;
      determining a level of an antialiasing process to be performed on the character based on the identified number of control points; and after the determining the level of the antialiasing process for the character, drawing the character by performing the antialiasing process at the level determined for the character.

8. The drawing apparatus according to claim 7, the operations further comprising confirming whether the outline data includes level data that indicates the level of the antialiasing process,
wherein the determining the level of the antialiasing process comprises determining the level based on the shape of the character if the outline data does not include the level data.

9. The drawing apparatus according to claim 8, wherein the determining the level of the antialiasing process comprises, if the outline data includes the level data, determining that the level of the antialiasing process to be performed when the character is drawn is a level indicated by the level data.

10. The drawing apparatus according to claim 1, wherein the determining the level of the antialiasing process comprises, in a case where the number of drawing commands required for the character is greater than a predetermined value, determining the level of the antialiasing process to be a higher value than a value of the level of the antialiasing process determined in a case where the number of drawing commands required for the character is not greater than the predetermined value.

11. The drawing apparatus according to claim 2, wherein the determining the level of the antialiasing process comprises, in a case where the ratio of the number of the curve-drawing commands to the number of the drawing commands is greater than a predetermined ratio, determining the level of the antialiasing process to be a higher value than a value of the level of the antialiasing process determined in a case where the ratio is not greater than the predetermined ratio.

12. The drawing apparatus according to claim 3, wherein the determining the level of the antialiasing process comprises, in a case where the number of control points of the character is greater than a predetermined value, determining the level of the antialiasing process to be a higher value than a value of the level of the antialiasing process determined in a case where the number of control points of the character is not greater than the predetermined value.

13. The drawing apparatus according to claim 7, wherein the determining the level of the antialiasing process comprises, in a case where the number of control points of the character is greater than a predetermined threshold value, determining the level of the antialiasing process to be a higher value than a value of the level of the antialiasing process determined in a case where the number of control points is not greater than the predetermined threshold value.

14. A non-transitory computer-readable medium storing instructions that, when executed by a computer of a drawing apparatus for use in displaying a character defined in a predetermined outline font format, cause the computer to perform operations comprising:
before drawing the character, identifying a number of drawing commands required for the character based on outline data corresponding to a shape of the character in the predetermined outline font format;
determining a level of an antialiasing process to be performed on the character based on the identified number of drawing commands; and
after the determining the level of the antialiasing process for the character, drawing the character by performing the antialiasing process at the level determined for the character.

15. A drawing method executed by a drawing apparatus for use in displaying a character defined in a predetermined outline font format, the drawing method comprising:
before drawing the character, identifying a number of control points of the character based on outline data corresponding to a shape of the character in the predetermined outline font format;
determining a level of an antialiasing process to be performed on the character based on the identified number of control points; and
after the determining the level of the antialiasing process for the character, drawing the character by performing the antialiasing process of at the level determined for the character.

16. A non-transitory computer-readable medium storing instructions that, when executed by a computer of a drawing apparatus for use in displaying a character defined in a predetermined outline font format, cause the computer to perform operations comprising:
before drawing the character, identifying a number of control points of the character based on outline data corresponding to a shape of the character in the predetermined outline font format;
determining a level of an antialiasing process to be performed on the character based on the identified number of control points; and
after the determining the level of the antialiasing process for the character, drawing the character by performing the antialiasing process at the level determined for the character.

* * * * *